June 5, 1934. M. D. WELLER 1,961,995
DIRECTION SIGNAL FOR MOTOR VEHICLES
Filed Nov. 11, 1931 2 Sheets-Sheet 2
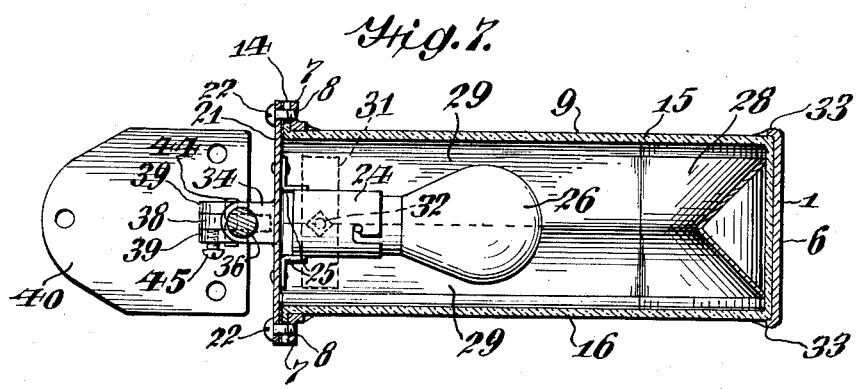
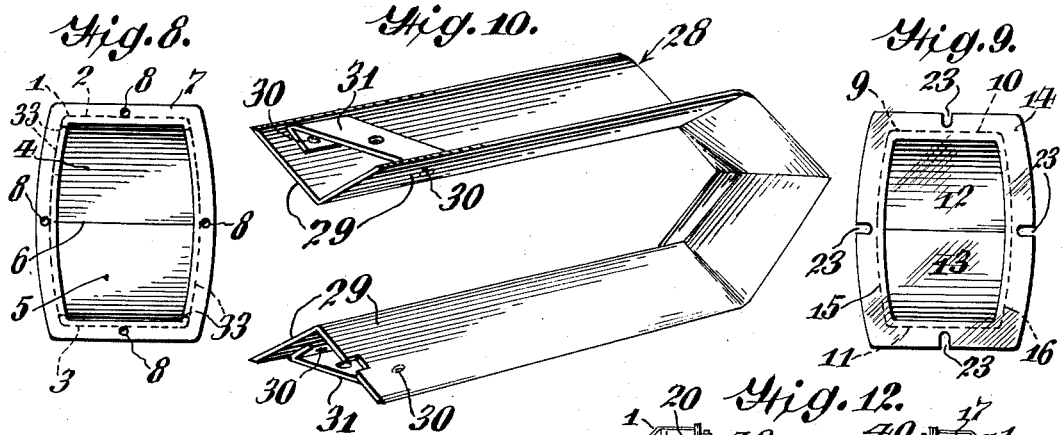
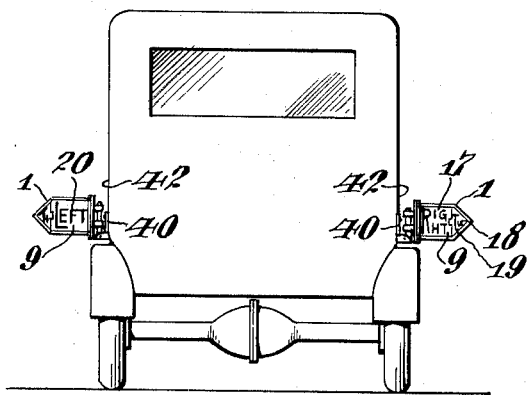
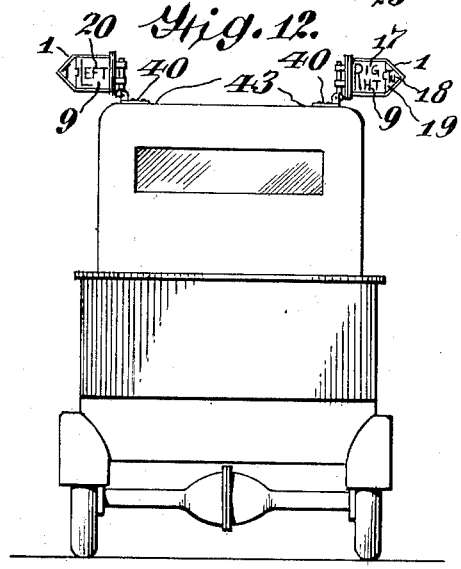
Marcus D. Weller,
INVENTOR
BY Victor J. Evans
ATTORNEY Patented June 5, 1934

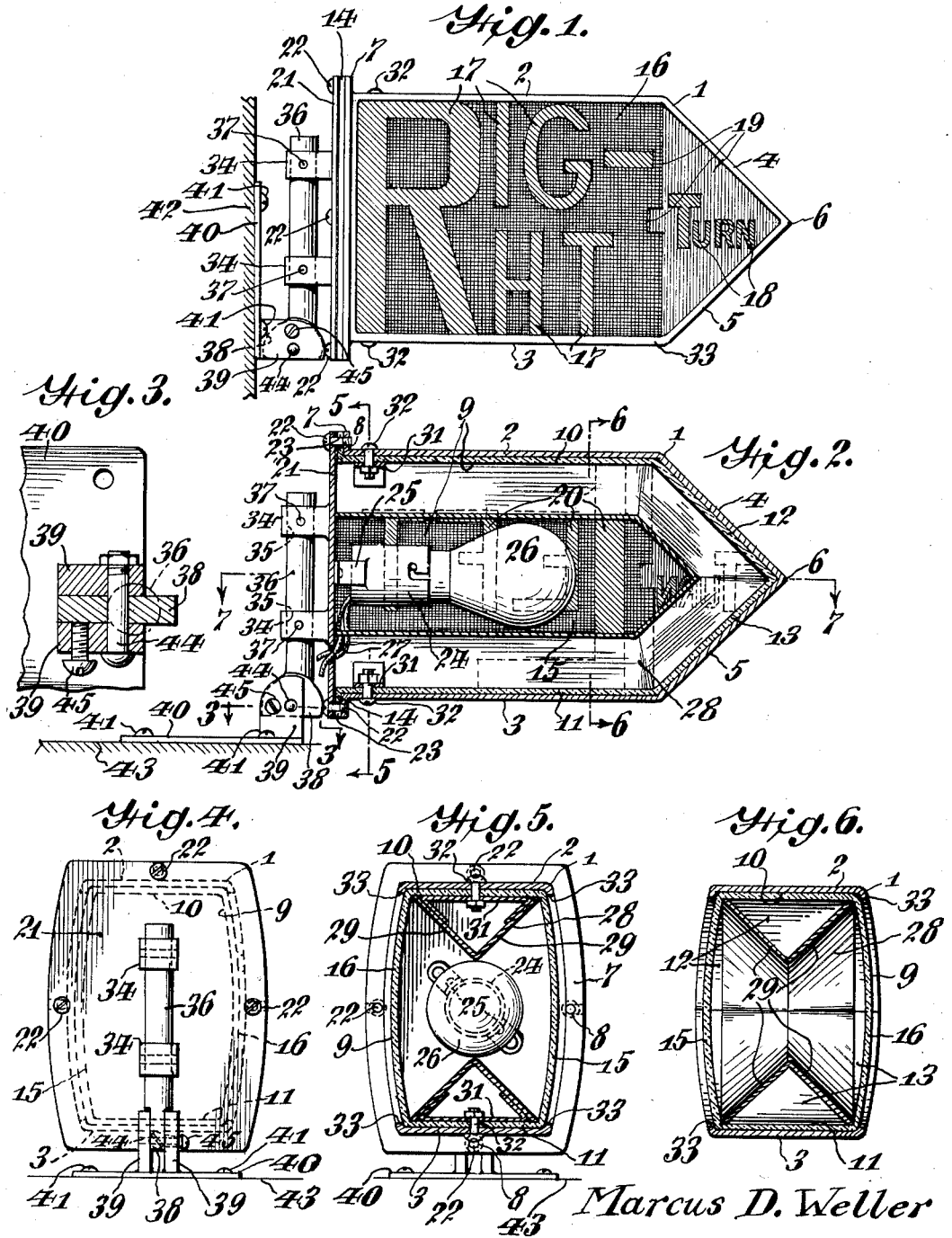

1,961,995

UNITED STATES PATENT OFFICE 1,961,995

DIRECTION SIGNAL FOR MOTOR VEHICLES

Marcus Dwight Weller, Allentown, Pa.

Application November 11, 1931, Serial No. 574,413

1 Claim. (Cl. 177—329)

The present invention relates to an improved direction signal for motor vehicles, namely for indicating a right or a left turn to drivers of vehicles in the rear, the electrical illumination of the signal being accomplished by any suitable means (not shown) operated by the driver in front.

One of the purposes of the invention is to provide a direction signal housing comprising a metallic skeleton frame for the support of a glass housing, the opposite front and rear faces of which have transparent letters indicating a right turn or a left turn, in conjunction with means having operative connection with the housing for the support of the same on the vehicle at any suitable or desirable location. It is obvious that the front and rear faces of the signal housing of the signal on the right hand side of the motor vehicle will have the transparent words right while the corresponding faces of the glass housing of the signal on the left will have the words left.

Another purpose is to provide, in a direction signal a skeleton frame provided with means for retaining the glass housing in position and at the same time retaining an interior V shaped reflector, for reflecting the light rays through the transparent words on the front and rear faces of the glass housing.

Another purpose is to provide an improved holding means for the direction signal for supporting the direction signal from an upright position or on a horizonal portion of the motor vehicle, so that the direction signal may be supported in a horizontal position in either instance.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in elevation illustrating the direction signal, showing the face of the glass housing to indicate the right turn, with the means for supporting the direction signal from an upright surface.

Figure 2 is a longitudinal sectional view through a direction signal wherein the front wall of the glass housing appearing in the rear shows the word "left", and illustrating the direction signal carried by a horizontal support.

Figure 3 is a sectional view on line 3—3 of Figure 2.

Figure 4 is a view in end elevation showing the means for supporting the direction signal.

Figure 5 is a sectional view on line 5—5 of Figure 2.

Figure 6 is a sectional view on line 6—6 of Figure 2.

Figure 7 is a sectional view on line 7—7 of Figure 2.

Figure 8 is a view in elevation of the metallic skeleton frame, looking at one end of the frame.

Figure 9 is a view in elevation of the glass housing showing one end thereof which has a flange and adapted to be inserted in the skeleton frame shown in Figure 8.

Figure 10 is a view in perspective of the V shaped insert reflector.

Figure 11 is a rear view of a motor vehicle, showing the right and left direction signals.

Figure 12 is a rear view of a truck motor vehicle, illustrating right and left direction signals on the top of the truck.

Referring to the drawings 1 identifies a skeleton frame which comprises upper and lower parallel walls 2 and 3, which are joined at one end of the frame by the angularly disposed walls 4 and 5, merging to an apex 6. The other end of the skeleton frame terminates in a rectangular portion 7, which has openings 8. This skeleton frame receives a glass housing 9, which conforms to the skeleton frame, therefore it has the upper and lower walls 10 and 11 corresponding to and engaging the walls 2 and 3, and the angularly disposed walls 12 and 13, which correspond to and engage walls 4 and 5. This glass housing at its end opposite the walls 12 and 13 merges into a lateral flange 14, which corresponds to and engages the rectangular portion 7 of said skeleton frame. A close inspection of the drawings discloses that the front and rear faces of the glass housing are slightly bulged or oval shape, with which the portion 7 of the skeleton frame and the flange 14 conform, as will be observed upon reference to Figures 4, 5, and 6.

On inspection of Figure 1 it is to be noted that the front and rear walls 15 and 16 of the glass housing have transparent lettering 17 for giving the direction "right turn", to appear in green. In other words the glass, when forming the housing is so constructed that the front and rear walls 15 and 16 are nontransparent, excepting where the lettering "right turn" is formed, and this lettering will appear in green, therefore the lettering is lined to indicate such color oring. The direction signal in Figure 1 is to be used on the right hand side of a motor vehicle. Furthermore where the word "turn" 18 appears, the lettering thereof is transparent and green, but that part of the glass somewhat simulating an arrow outline at 19 is of red transparency.

The direction signal in Figure 2 is to be used on the left side of a motor vehicle, but is merely projected down from the view in Figure 1 for simplicity of illustration, but when in actual use the device would be turned end for end, therefore the transparent lettering indicating left turn 20 (which is similar in construction and arrangement as the lettering "right turn" in Figure 1) would appear to indicate a left turn.

A plate 21 is provided for the purpose of closing the open end of the glass housing 9, there being screws 22 passing through the plate 21 and engaging notches 23 of the flange 14 of the glass housing and in turn threaded in the openings 8 of the rectangular end of the skeleton frame.

The inner face of the plate 21 carries a conventional type of socket 24 supported at 25 on the plate 21, and engaged in the socket in any well known manner is an incandescent bulb 26, there being suitable leads 27 extending from the socket and through the plate 21, and which may connect in any well known manner with the lighting system (not shown) of the motor vehicle. The circuit for this bulb may be such that it may be closed by any well known hand operated switch (not shown), or may be closed by any well known means when the steering wheel is turned to the right or the left.

Arranged within the glass housing 9 is a reflector 28, which is V shaped in cross section as shown in Figures 7 and 10 and made to conform to and engage within the glass housing, therefore it has opposite angularly arranged reflecting facets 29. These facets or faces 29 act to reflect through the transparent lettering forwardly and rearwardly. Extending across the hollows of the upper and lower lugs of the reflector 28 and secured thereto as by means of spot welding at 30 are straps 31, through which bolts 32 pass for the purpose of holding the reflector in the glass housing. The fact is the bolts 32 also pass through the upper and lower walls of the glass housing and through the upper and lower walls 2 and 3 of the skeleton frame, for the purpose of insuring holding the various parts together.

In order to further insure holding the glass housing in position, the upper and lower walls 2 and 3 of the skeleton frame have flanges 33 which overlie the glass housing in order to prevent lateral movement thereof. The plate 21 has formed on its outer face lateral bearings 34 having axially aligned openings 35 which receive a pin or post 36. Engaged through the bearings 34 and designed to contact with the pin or post 36 are set screws 37 which hold the direction signal adjusted on the post or pin 36. The lower end of the post or pin terminates in an ear 38, which is offset out of alignment with the post or pin and is arranged between ears or lugs 39 projecting laterally from a plate 40. This plate 40 may be secured by screws 41 to a vertical surface support 42 as in Figure 1 or as in Figure 11, or to a horizontal surface support 43 in Figure 2 or as in Figure 12. A pivot bolt 44 passes through the ears 38 and 39 for pivotally supporting the post or pin 36 in a vertical position, either in parallelism with the vertical surface support 42, or at right angles to the horizontal surface support 43. It is obvious that by means of a set screw 45 as shown clearly in Figures 1, 2 and 3 threaded through one of the ears 39 may bear against the ear 38, and thereby hold the post or pin 36 in different positions, or rather hold the plate 40 either in a vertical position as in Figure 1 or a horizontal position as in Figure 2.

The invention having been set forth, what is claimed is:

In a signal as set forth, a transparent casing having a lateral directed V shaped end, which with indicia on the front and back wall of the casing indicate directions of travel, illuminating means in the casing, and a reflector in the casing, said reflector lengthwise conforming to the casing and its V shaped end, said reflector straddling the illuminating means, the wall of the reflector being V shaped in cross section throughout its length with its reflecting walls diverging front and back and laterally from the illuminating means, and cross pieces carried by and within the hollows of the upper and lower parts of the reflector, said cross pieces including fastening means for holding the reflector in place.

MARCUS DWIGHT WELLER.